United States Patent
Chen

(10) Patent No.: US 11,553,422 B2
(45) Date of Patent: Jan. 10, 2023

(54) ELECTRONIC DEVICE CAPABLE OF REDUCING COMMUNICATION POWER AND BLUETOOTH CHIP THEREOF

(71) Applicant: AUDIOWISE TECHNOLOGY INC., Hsinchu County (TW)

(72) Inventor: Yu-Feng Chen, Hsinchu County (TW)

(73) Assignee: AIROHA TECHNOLOGY CORP., Hsinchu (TW)

( * ) Notice: Subject to any disclaimer, the term of this patent is extended or adjusted under 35 U.S.C. 154(b) by 41 days.

(21) Appl. No.: 17/325,577

(22) Filed: May 20, 2021

(65) Prior Publication Data

US 2022/0377663 A1    Nov. 24, 2022

(51) Int. Cl.
*H04W 52/02*    (2009.01)
(52) U.S. Cl.
CPC ... *H04W 52/0216* (2013.01); *H04W 52/0222* (2013.01); *H04W 52/0229* (2013.01)

(58) Field of Classification Search
CPC ......... H04W 52/0216; H04W 52/0222; H04W 52/0229; H04W 52/0245; H04L 2027/0095; H04L 27/0014
See application file for complete search history.

(56) References Cited

U.S. PATENT DOCUMENTS

| | | | |
|---|---|---|---|
| 2003/0007473 A1* | 1/2003 | Strong | G01S 5/02 370/350 |
| 2019/0190765 A1* | 6/2019 | Murali | H04W 52/0229 |
| 2019/0289543 A1* | 9/2019 | Kandasamy | H04W 52/0235 |

* cited by examiner

*Primary Examiner* — Omer S Mian
(74) *Attorney, Agent, or Firm* — McClure, Qualey & Rodack, LLP

(57) ABSTRACT

There is provided an electronic device having Bluetooth communication function. The electronic device confirms whether the received signal power is larger than a power threshold within an interval of 72 microseconds every time an RF receiver is turned on in the receive slot so as to determine whether to continuously keep the RF receiver being turned on or to turn off the RF receiver to save power.

17 Claims, 2 Drawing Sheets

ELECTRONIC DEVICE CAPABLE OF REDUCING COMMUNICATION POWER AND BLUETOOTH CHIP THEREOF

BACKGROUND

1. Field of the Disclosure

This disclosure generally relates to Bluetooth communication and, more particularly, to an electronic device and a Bluetooth chip thereof that confirm whether to continuously receive a packet in a receive slot after an RF receiver is turned on corresponding to the receive slot to reduce the power consumption.

2. Description of the Related Art

Please refer to FIG. 1, it is a schematic diagram of the packet exchange between a master device and a slave device of a Bluetooth communication system. The slave device uses a time interval ts in each receive slot RX to receive packets from the master device, and the master device uses a time interval tm in each receive slot RX to receive packets from the slave device. As there is no rule provided in the Bluetooth standard to determine whether to continuously receive a packet according to a received signal strength indicator (RSSI), without any judgment reference, the master device and the slave device turn on the RD receiver thereof till an end of a set value even through there is no complete packet being received (e.g., receiving noises or interference) within a receive slot RX, such that the power is wasted. Said set value is generally longer than 100 microseconds.

Accordingly, the present disclosure provides a Bluetooth module or chip embedded with a judgment reference that identifies whether a packet is actually received in every receive slot RX. If there is no packet is actually received in a receive slot RX, the RF receiver and/or the modem is turned off so as to reduce the unnecessary power consumption in the packet exchange.

SUMMARY

The present disclosure provides an electronic device and a Bluetooth chip thereof that identify whether an access code of a packet is sent from the transmitter within every receive slot so as to identify whether to continuously turn on the RF receiver to receive the packet in every receive slot.

The present disclosure provides an electronic device including an antenna and an auto gain controller, and configured to receive a packet in a Bluetooth connection state. The antenna is configured to receive the packet and generate a received signal accordingly. The auto gain controller is configured to compare a signal power associated with the received signal with a power threshold within a receive slot to identify whether the signal power is continuously larger than the power threshold within an interval of 72 microseconds.

The present disclosure further provides a Bluetooth chip including an antenna, an RF receiver and a modem, and configured to receive a packet in a Bluetooth connection state. The antenna is configured to receive the packet and generate a received signal accordingly. The RF receiver is configured to convert the received signal to a digital signal within a receive slot. The modem is configured to compare a signal power of the digital signal with a power threshold within an interval of 72 microseconds to accordingly determine whether to send a stop signal within the receive slot.

The present disclosure further provides a Bluetooth chip including an antenna, an RF receiver and au auto gain controller. The antenna is configured to receive a packet and generate a received signal accordingly. The RF receiver is configured to convert the received signal to a digital signal after being turned on corresponding to a receive slot. The auto gain controller is configured to continuously compare a signal power of the digital signal with a power threshold within an interval of 72 microseconds after the RF receiver is turned on and the signal power of the digital signal is larger than the power threshold so as to determine whether to early turn off the RF receiver in the receive slot.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
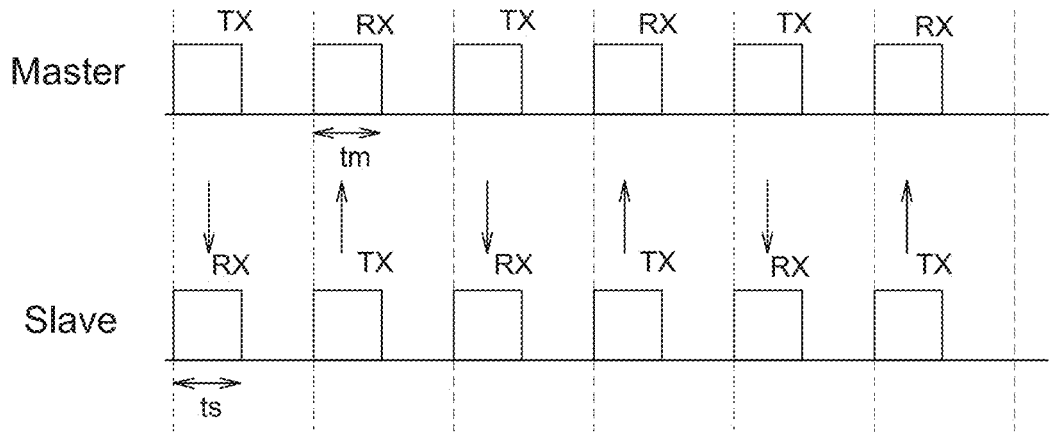
FIG. 1 is a schematic diagram of the message exchange of a Bluetooth communication system.

One objective of the present disclosure is to provide an electronic device and a Bluetooth chip thereof that identify whether to turn off the analog front end and a part of the digital backend in advance according to the signal power received in every receive slot (e.g., RX shown in FIG. 1) so as to reduce the power consumption in the packet exchange.

In the present disclosure, the electronic device is selected, without particular limitations, from, for example a portable electronic device, a wearable electronic device, a vehicle electronic device, a computer peripheral, a Bluetooth earphone, a Bluetooth speaker or other electronic devices using Bluetooth communication to transmit and receive data.

The electronic device of the present disclosure is a master device or a slave device in the Bluetooth communication. The electronic device receives traffic packets sent within a receive slot (e.g., RX shown in FIG. 1) in the connection state via a Bluetooth chip thereof and identifies whether the signal power is stable in the receive slot. In this way, it is able to prevent the RF receiver and the modem from being continuously turned on when there is no packet being received or there are only noises being received in the receive slot.

Figure 2:
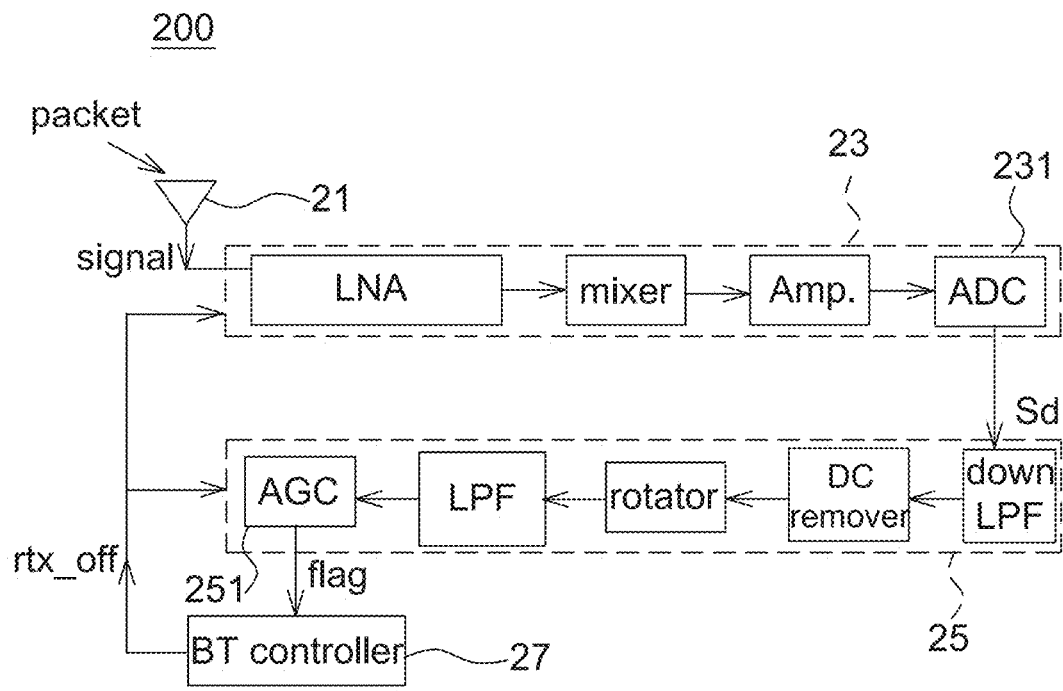
FIG. 2 is a block diagram of a Bluetooth chip of an electronic device according to one embodiment of the present disclosure.

Please refer to FIG. 2, it is a block diagram of a Bluetooth chip 200 of an electronic device according to one embodiment of the present disclosure. The Bluetooth chip 200 includes an antenna 21, an RF receiver 23, a modem 25 and a Bluetooth controller (shown as BT controller) 27, wherein the RF receiver is also referred to an analog front end herein, and the modem 25 and the BT controller 27 are also referred to a digital backend herein.

Figure 3:
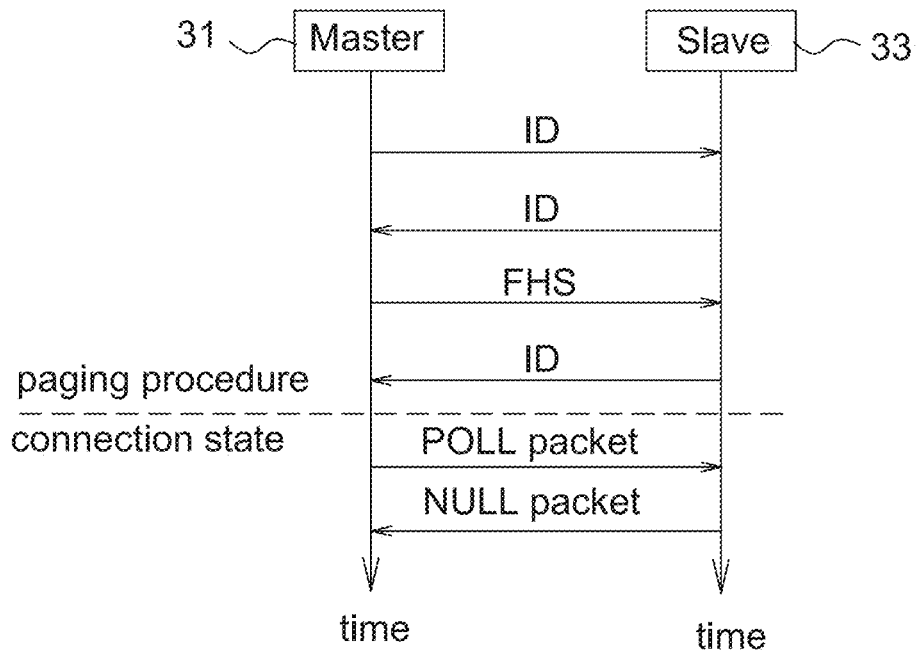
FIG. 3 is a link manager protocol (LMP) message sequence chart of a Bluetooth communication system according to one embodiment of the present disclosure.

FIG. 3 is a link manager protocol (LMP) message sequence chart of a Bluetooth communication system according to one embodiment of the present disclosure. As shown in FIG. 3, in the paging procedure (e.g., above the dashed line), the master device 31 firstly sends a page message to the slave device 33, and then the slave device 33 replies a page response message to the master device 31. After successively receiving the page response message, the master device 31 then transmits an FHS packet to the slave device 33. After successively receiving the FHS packet, the slave device 33 replies another page response message to the master device 31 as an acknowledgement of receiving the FHS packet, and the establishment of a link is accomplished. And then, the master device 31 and the slave device 33 enter a connection state.

The paging procedure is known to the art and not a main objective of the present disclosure, and thus details thereof are not described herein.

In the connection state, the master device 31 transmits a POLL packet to the slave device 33, and the slave device 33 replies a NULL packet to the master device 31 as a first traffic therebetween. The definition and function of the FHS packet, the POLL packet and the NULL packet are known to the art and thus details thereof are not described here.

The antenna 21 receives a packet and generates a received signal correspondingly. When the electronic device is the slave device 33, the packet is from the master device 31. On the other hand, when the electronic device is the master device 31, the packet is from the slave device 33.

The radio frequency (RF) receiver 23 is coupled to the antenna 21 to receive the received signal. The RF receiver 23 includes an analog-to-digital converter (ADC) 231 for converting the received signal to a digital signal Sd after the RF receiver 23 is turned on corresponding to the receive slot (e.g., RX shown in FIG. 1). Details of the analog-digital conversion are known to the art, and thus are not described herein.

It is appreciated that the RF receiver 23 further includes other components to process the received signal, e.g., low noise amplifier (LNA), mixer and amplifier (Amp.). Said other components are known to the art and not a main objective of the present disclosure, and thus details thereof are not repeated herein. It is appreciated that functions of every component in the RF receiver 23 are considered to be executed by the RF receiver 23.

The modem 25 compares a signal power of the digital signal Sd with a power threshold (predetermined set and stored) within an interval of 72 microseconds (i.e. the interval receiving an access code of packets), and determines whether to send a stop signal (e.g., shown as flag in FIG. 2), accordingly. More specifically, the modem 25 includes an auto gain controller (AGC) 251 for comparing a signal power associated with the received signal with a power threshold in the receive slot RX so as to identify whether the signal power is continuously larger than the power threshold within an interval of 72 microseconds in the receive slot RX. Said signal power associated with the received signal herein is referred to, for example, a signal power of the digital signal Sd. The digital signal Sd is formed by signal amplifying, signal mixing, filtering and rotating from the received signal, and thus the digital signal Sd has a corresponding relationship with the received power according to these processes.

It is appreciated that the modem 25 further includes other components to process the digital signal Sd, e.g., down LPF, DC remover, rotator and low pass filter (LPF). The down LPF is, for example, a sine filter for down-sampling and reducing valid bits of the digital signal Sd. The DC remover is for cancelling the DC interference at 0 MHZ and coupled downstream of the down LPF. The rotator is for frequency shifting to rotate data of 1 MHZ to 0 MHZ and coupled downstream of the DC remover. The LPF is for cancelling interference and coupled downstream of the rotator. The AGC 251 is coupled downstream of the LPF. It is appreciated that functions of every component in the modem 25 are all considered to be executed by the modem 25.

When identifying that the signal power is not continuously larger than the power threshold within the interval of 72 microseconds in the receive slot, the AGC 251 sends a stop signal flag to the BT controller 27. The BT controller 27 turns off at least one of the RF receiver 23 and the modem 25, e.g., by sending a control signal rtx_off to the RF receiver 23 and/or the modem 25.

In one aspect, when identifying that the signal power is lower than the power threshold at any time within the interval of 72 microseconds in the receive slot, the auto gain controller 251 of the modem 25 immediately sends the stop signal flag to the BT controller 27.

In another aspect, when identifying that the signal power is lower than the power threshold at any time within the interval of 72 microseconds in the receive slot, the auto gain controller 251 of the modem 25 sends the stop signal flag to the BT controller 27 at an end of the interval of 72 microseconds. That is, the modem 25 is arranged in the way that the stop signal flag is sent within the interval of 72 microseconds or at the 72 microseconds after the signal power starts to be larger than the power threshold (i.e. start of an access code of packet) in the receive slot.

As the packet does not reach the antenna 21 exactly at the start of a receive slot (i.e. RX in FIG. 1), the receive slot RX generally includes an uncertainty window to accommodate this time shift. Therefore, the start of an access code of packet may not be aligned with a start of the receive slot RX.

Accordingly in the present disclosure, the auto gain controller 251 of the modem 25 continuously compares a signal power of the digital signal Sd with a power threshold within an interval of 72 microseconds after (1) the RF receiver 23 is turned on corresponding to every receive slot and (2) the signal power of the digital signal Sd is larger than the power threshold to determine whether to early (prior to the set value in the conventional vendor protocol) turn off the RF receiver 23 and/or the modem 25 in every receive slot.

When the RF receiver 23 and/or the modem 25 is turned off within one receive slot, the BT controller 27 does not recognize an access code of the packet in the one receive slot to further reduce the consumption power.

The BT controller 27 further turns on the RF receiver 23 and the modem 25 in a next receive slot to perform the identification of a next round. The BT controller 27 is implemented, for example, by hardware. The BT controller 27 includes a processor for performing functions thereof.

Preferably, the electronic device of the present disclosure starts to compare the signal power with a predetermined power threshold after a connection state (i.e. behind the paging procedure) is entered.

For example referring to FIG. 3, when the electronic device is a slave device 33, the AGC 251 of the modem 25 begins to compare the signal power with a power threshold when the Bluetooth chip 200 of the electronic device is receiving a POLL packet, which is configured as a first traffic of the Bluetooth connection state.

For example referring to FIG. 3 again, when the electronic device is a master device 31, the AGC 251 of the modem 25 begins to compare the signal power with a power threshold when the Bluetooth chip 200 of the electronic device is receiving a NULL packet, which is configured as a first traffic of the Bluetooth connection state.

Figure 4:
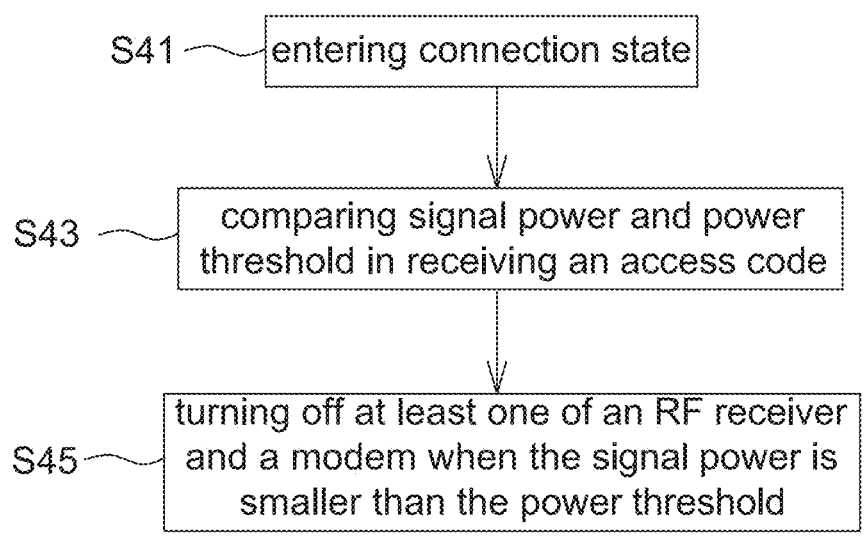
FIG. 4 is an operational flow chart of a Bluetooth chip of an electronic device according to one embodiment of the present disclosure.

Please refer to FIG. 4, it is an operational flow chart of a Bluetooth chip 200 of an electronic device according to one embodiment of the present disclosure, including the steps of: entering a connection state (Step S41); comparing a signal power and a power threshold in an interval receiving an access code (Step S43); and turning off at least one of an RF receiver and a modem when the signal power in smaller than the power threshold (Step S45).

Step S41: As shown in FIG. 3, after the slave device 33 replies a page response message to the master device 31 to acknowledge the receiving of the FHS packet, a connection state is entered. In the connection state, the RF receiver 23 and the modem 25 are turned on corresponding to every receive slot (e.g., RX shown in FIG. 1) waiting for receiving a packet.

Step S43: In the connection state, the master device 31 transmits a POLL packet and the slave device 33 replies a NULL packet as a first traffic. In the interval that the Bluetooth chip 200 receiving an access code of a packet (any packet type), i.e. 72 microseconds, the AGC 251 compares the signal power associated with a received signal with a pre-stored power threshold to identify whether to continuously turn on the RF receiver 23 and the modem 25 in a current receive slot. Said comparison begins after the transmission of the POLL packet and the NULL packet is started.

Step S45: When the signal power is not continuously larger than the power threshold within the interval of 72 microseconds in the current receive slot, it means that the packet currently being received is invalid, and thus the AGC 251 sends a stop signal flag to the BT controller 27. After receiving the stop signal flag, the BT controller 27 transmits a control signal rts_off to the RF receiver 23 and/or the modem 25 to turn off at least one of the RF receiver 23 and the modem 25. In another aspect, the BT controller 27 turns off only a part of the analog front end, e.g., turning off only the ADC 231, but not limited to. In an alternative aspect, the BT controller 27 turns off only a part of the digital backend, e.g., turning off only the AGC 251, but not limited to.

When the signal power is continuously larger than the power threshold within the interval of 72 microseconds in the current receive slot, the RF receiver 23 and the modem 25 are continuously turned on to receive a complete packet in the current receive slot.

As every packet exchanged in the connection state contains an access code, the present disclosure confirms whether to continuously receive a complete packet by recognizing the signal power within an interval receiving the access code. It is different from the conventional BT module that only waits to an end of a set time point.

It should be mentioned that although FIG. 2 shows that the AGC 251 is located in the modem 25, the present disclosure is not limited thereto. In another aspect, the AGC 251 is arranged outside the mode, 25. In an alternative aspect, the AGC is located in the analog front end (i.e. prior to the ADC) for comparing the signal power of a received analog signal with a power threshold to identify whether to continuously receive a current packet.

It should be mentioned that although FIG. 2 shows that the antenna 21 is one component of the Bluetooth chip 200, the present disclosure is not limited thereto. In another aspect, the antenna 21 is one component of the electronic device and outside the Bluetooth chip 200, and the BT receiver 23 is electronically coupled to the antenna 21.

As mentioned above, because the Bluetooth module of conventional electronic devices does not have the function of determining whether to continuously receive a packet according to RSSI, the RF receiver is still turned on in the receive slot even no packet being exchanged to waste unnecessary power. Therefore, the present disclosure further provides an electronic device and a Bluetooth chip thereof (e.g., FIG. 2) that identify whether the received signal power is continuously larger than a predetermined power threshold in every receive slot (e.g., as RX in FIG. 1) so as to determine whether to early turn off at least one of the RF receiver and the modem to save the power.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An electronic device, configured to receive a packet in a Bluetooth (BT) connection state, the electronic device comprising:
   an antenna, configured to receive the packet and generate a received signal accordingly;
   an auto gain controller, configured to compare a signal power associated with the received signal with a power threshold within a receive slot to identify whether the signal power is continuously larger than the power threshold within an interval of 72 microseconds;
   an RF receiver, a modem, and a BT controller, wherein
      when identifying that the signal power is not continuously larger than the power threshold within the interval of 72 microseconds, the auto gain controller is configured to send a stop signal to the BT controller, and
      the BT controller is configured to turn off at least one of the RF receiver and the modem according to the stop signal, and
   a control signal from the BT controller that goes to both the modem and the RF receiver, and is configured to selectively turn off either or both of the modem and the RF receiver.

2. The electronic device as claimed in claim 1, wherein the electronic device is a master device or a slave device of Bluetooth communication.

3. The electronic device as claimed in claim 2, wherein when the electronic device is the slave device, the auto gain controller starts to compare the signal power and the power threshold when the electronic device is receiving a POLL packet, which is configured as a first traffic of the Bluetooth connection state.

4. The electronic device as claimed in claim 2, wherein when the electronic device is the master device, the auto gain controller starts to compare the signal power and the power threshold when the electronic device is receiving a NULL packet, which is configured as a first traffic of the Bluetooth connection state.

5. The electronic device as claimed in claim 1, wherein when identifying that the signal power is lower than the power threshold at any time within the interval of 72 microseconds, the auto gain controller is configured to immediately send the stop signal to the BT controller.

6. The electronic device as claimed in claim 1, wherein when identifying that the signal power is lower than the power threshold at any time within the interval of 72 microseconds, the auto gain controller is configured to send the stop signal to the BT controller at an end of the interval of 72 microseconds.

7. The electronic device as claimed in claim 1, wherein when at least one of the RF receiver and the modem is turned off, the BT controller is configured not to recognize an access code of the packet within the receive slot.

8. A Bluetooth chip, configured to receive a packet in a Bluetooth (BT) connection state, the Bluetooth chip comprising:
   an antenna, configured to receive the packet and generate a received signal accordingly;
   an RF receiver, configured to convert the received signal to a digital signal within a receive slot;
   a modem, configured to compare a signal power of the digital signal with a power threshold within an interval of 72 microseconds to accordingly determine whether to send a stop signal within the receive slot, wherein when identifying that the signal Dower is not continuously larger than the power threshold within the interval of 72 microseconds, an auto gain controller of the modem is configured to send a stop signal to a BT controller, wherein the BT controller is configured to turn off at least one of the RF receiver and the modem according to the stop signal, and
   a control signal from the BT controller that goes to both the modem and the RF receiver, and is configured to selectively turn either or both of the modem and the RF receiver off.

9. The Bluetooth chip as claimed in claim 8, wherein when at least one of the RF receiver and the modem is turned off, the BT controller is configured not to recognize an access code of the packet within the receive slot.

10. The Bluetooth chip as claimed in claim 8, wherein when identifying that the signal power is lower than the power threshold at any time within the interval of 72 microseconds, the modem is configured to immediately send the stop signal.

11. The Bluetooth chip as claimed in claim 8, wherein when identifying that the signal power is lower than the power threshold at any time within the interval of 72 microseconds, the modem is configured to send the stop signal at an end of the interval of 72 microseconds.

12. The Bluetooth chip as claimed in claim 8, wherein the modem is configured to start to compare the signal power and the power threshold when the Bluetooth chip is receiving a POLL packet, which is configured as a first traffic of the Bluetooth connection state.

13. The Bluetooth chip as claimed in claim 8, wherein the modem is configured to start to compare the signal power and the power threshold when the Bluetooth chip is receiving a NULL packet, which is configured as a first traffic of the Bluetooth connection state.

14. A Bluetooth chip, comprising:
   an antenna, configured to receive a packet and generate a received signal accordingly;
   an RF receiver, configured to convert the received signal to a digital signal after being turned on corresponding to a receive slot; and
   an auto gain controller, configured to continuously compare a signal power of the digital signal with a power threshold within an interval of 72 microseconds after the RF receiver is turned on and the signal power of the digital signal is larger than the power threshold so as to determine whether to early turn off the RF receiver in the receive slot,
   a modem and a BT controller, wherein
      when identifying that the signal power is lower than the power threshold at any time within the interval of 72 microseconds, the auto gain controller is configured to send a stop signal to the BT controller, and
      the BT controller is configured to turn off at least one of the RF receiver and the modem according to the stop signal, and
   a control signal from the BT controller that goes to both the modem and the RF receiver, and is configured to selectively turn either or both of the modem and the RF receiver off.

15. The Bluetooth chip as claimed in claim 14, wherein when identifying that the signal power is lower than the power threshold at any time within the interval of 72 microseconds, the auto gain controller is configured to immediately turn off the RF receiver.

16. The Bluetooth chip as claimed in claim 14, wherein the auto gain controller is configured to start to compare the signal power and the power threshold when the Bluetooth chip is receiving a POLL packet, which is configured as a first traffic of a Bluetooth connection state.

17. The Bluetooth chip as claimed in claim 14, wherein the auto gain controller is configured to start to compare the signal power and the power threshold when the Bluetooth chip is receiving a NULL packet, which is configured as a first traffic of a Bluetooth connection state.

* * * * *